United States Patent Office 3,231,533
Patented Jan. 25, 1966

3,231,533
SELF-CURING ACRYLIC INTERPOLYMERS
Robert Y. Garrett, Avon Lake, and Gorman E. Eilbeck, Elyria, Ohio, assignors to The B. F. Goodrich Company, New York, N.Y., a corporation of New York
No Drawing. Filed June 30, 1960, Ser. No. 39,787
13 Claims. (Cl. 260—29.6)

This invention relates to self-curing synthetic polymers and more particularly pertains to interpolymers containing units derived from a mixture comprising a lower ester of an alpha,beta-olefinically unsaturated monocarboxylic acid, an alpha,beta-olefinically unsaturated nitrile, an alpha,beta-olefinically unsaturated carboxylic acid and an N-alkylol derivative of an olefinically unsaturated polymerizable carboxylic acid amide, latices of same and to the method for preparing said interpolymer and lattices.

Synthetic polymers of esters of aplha,beta-olefinically unsaturated monocarboxylic acids, such as ethyl acrylate, are well known and have established commercial utility. The known polymers, however, are not particularly useful, per se, as coating agents, adhesives and the like. It is the usual practice to compound thermosetting resins, tackifiers and the like with the aforementioned well known synthetic polymers when they are to be used in coating and dipping applications, especially when good solvent resistance is necessary. The particular compounding formulation required for a given application may vary greatly. It would be highly desirable to obtain a single homogeneous polymeric composition which is stable for long periods of standing and can be used in numerous coating and impregnating operations to give superior products with little or no change in formulation.

Accordingly, an object of the present invention is the provision of modified synthetic polymers, primarily of the acrylate ester type, which in addition to their inherent superior heat and light aging properties also have unexpectedly good adhesive properties. Another object is the provision of novel synthetic polymers which can be readily deposited on or in a substrate material and subsequently insolubilized by moderate heating. Another object is the provision of novel, stable synthetic polymer lattices which are useful in dipping, impregnating and coating applications. Still another object is the provision of novel coated and impregnated leather, paper and nonwoven fabric articles characterized by their high strength and unexpectedly good aging properties and solvent resistance. Yet another object is the provision of a method for preparing the aforementioned novel synthetic polymers, the latices and articles coated and impregnated therewith.

The accomplishment of the foregoing and other objects will become apparent from the following description and examples, it being understood that many modifications and changes can be made in the products and processes disclosed herein by those skilled in the art without departing from the spirit and scope of this invention.

We have discovered a novel composition comprising an interpolymer composed of units derived from a polymerizable mixture of (1) from about 90 to 99.8% by weight of at least one lower alkyl ester of an alpha,beta-olefinically unsaturated monocarboxylic acid, (2) from 0 to about 5% by weight of an alpha,beta-olefinically unsaturated nitrile, (3) from about 0.1 to 5% by weight of an alpha,beta-olefinically unsaturated carboxylic acid and (4) from about 0.1 to 5% by weight of an N-alkylol amide of an alpha,beta-olefinically unsaturated carboxylic acid.

The lower alkyl esters of aplha,beta-monoolefinically unsaturated monocarboxylic acids embodied in this invention are of the type

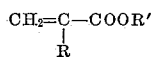

wherein R is a member of the class consisting of hydrogen, an alkyl radical having from 1 to 4 carbon atoms, a halogen, and a cyano group, and R' represents an alkyl radical havings from 1 to 4 carbon atoms. Representative monomers of the foregoing type are methyl acrylate, ethyl acrylate, the propyl acrylates and the butyl acrylates; methyl methacrylate, ethyl methacrylate, the propyl methacrylates and the butyl methacrylates; and methyl ethacrylate, ethyl ethacrylate, the propyl ethacrylates and the butyl ethacrylates and the like. Preferred are the monomers of the above formula wherein R is hydrogen. Most preferred is ethyl acrylate.

The alpha,beta-olefinically unsaturated nitriles useful in the interpolymers embodied herein are preferably the monoolefinically unsaturated nitriles having from 3 to 10 carbon atoms such as acrylonitrile, methacrylonitrile, ethacrylonitrile and the like. Most preferred are acrylonitrile and methacrylonitrile.

The alpha,beta-olefinically unsaturated carboxylic acids useful in this invention are those having from 3 to 6 carbon atoms, representative members of which include acrylic acid, methacrylic acid, ethacrylic acid, mesaconic acid, citraconic acid, sorbic acid, maleic acid, crotonic acid and the like and anhydrides thereof. The preferred monomeric acids are the apha,beta-monoolefinically unsaturated carboxylic acids. The most preferred are the alha,beta-monoolefinically unsaturated monocarboxylic acids, particularly acrylic and methacrylic acids.

The N-alkylol amides of alpha,beta-olefinically unsaturated carboxylic acids embodied herein include those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type because of their ready availability and relative low cost are the N-alkylol amides of alpha,beta-monoolefinically unsaturated monocarboxylic acids and the most preferred are N-methylol acrylamide and N-methylol methacrylamide.

The preferred interpolymers embodied in the present invention are those composed of units derived from the polymerization of a mixture of (1) from about 90 to 99.8% by weight of at least one ester having the structure

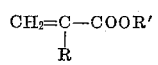

wherein R is a member of the class consisting of hydrogen, an alkyl radical having from 1 to 4 carbon atoms, a halogen and a cyano group and R' represents an alkyl radical having from 1 to 4 carbon atoms, (2) from 0 to about 5% by weight of an alpha,beta-monoolefinically unsaturated nitrile, (3) from about 0.1 to 5% by weight of an alpha,beta-monoolefinically unsaturated monocarboxylic acid and (4) from about 0.1 to 5% by weight of an N-alkylol amide of an alpha,beta-olefinically unsaturated carboxylic acid having from 4 to 10 carbon atoms.

In the above-described proportions it is to be understood that when a maximum amount of one monomer is employed in the polymerization mixture that the relative proportions of the remaining monomers must necessarily be adjusted so that the combined weight percentage of monomers used in any single polymer will total substantially 100%.

The polymers embodied herein are prepared in the preferred manner in an aqueous medium in the presence of a suitable polymerization catalyst in the range of 40 to 60% total solids. The aqueous medium may be emulsifier free or it may contain an emulsifier. Suitable emulsifiers include organic sulfates and sulfonates such as sodium lauryl sulfate, ammonium lauryl sulfate, the alkali metal and ammonium salts of sulfonated petroleum or paraffin oils, the sodium salts of aromatic sulfonic acids such as the sodium salt of naphthalene sulfonic acids, the sodium salts of dodecane-1-sulfonic acid, octadiene-1-sulfonic acid, etc.; aralkyl sulfonates such as sodium isopropyl benzene sulfonate, sodium dodecyl benzene sulfonate and sodium isobutyl naphthalene sulfonate; alkali metal and ammonium salts of sulfonated dicarboxylic acid esters and amides such as sodium dioctyl sulfo succinate, sodium octadecyl sulfo succinamate and the like, and others. The so-called cationic emulsifiers such as the salts of strong inorganic acids and organic bases containing long carbon chains, for example, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfonic ester, and others may be used. Preferred, however, are the alkali metal and ammonium salts of aromatic sulfonic acids, aralkyl sulfonates and long chain alkyl sulfates. In addition to the above and other polar or ionic emulsifiers, still other materials which may be used, singly or in combination with one or more of the foregoing types of emulsifiers include the so-called "non-ionic" emulsifiers such as the polyether alcohols prepared by condensing ethylene or propylene oxide with higher alcohols, the fatty alkylol-amine condensates, the diglycol esters of lauric, oleic and stearic acids, and others. It is also often desirable to add post-polymerization emulsifiers to the latices embodied herein for improved stability.

The catalyst, required for satisfactory polymerization rate, may be any of those commonly employed for the polymerization of acrylic monomers including the various peroxygen compounds such as hydrogen peroxide, benzoyl peroxide, pelargonyl peroxide, cumene hydroperoxide, tertiary butyl hydroperoxide, 1-hydroxy-cyclohexyl hydroperoxide, tertiary butyl diperphthalate, tertiary butyl perbenzoate, sodium, potassium and ammonium persulfate and others.

Particularly preferred as polymerization initiators are the water-soluble peroxygen compounds such as hydrogen peroxide, and the sodium, potassium and ammonium persulfates, the water-soluble oxidation-reduction or "redox" types of catalysts, and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate with a reducing substance such as a polyhydric phenol, an oxidizable sulfur compound such as sodium bisulfite, sodium sulfite and the like; the combination of a water-soluble peroxygen compound such as a potassium persulfate and dimethylamino propionitrile; the combination of a water-soluble peroxygen compound with a reducing sugar or with a combination of a diazomercapto compound and a water-soluble ferricyanide compound and others. Heavy metal ions which greatly activate potassium persulfate catalyzed and redox catalyzed polymerizations include those of silver, copper (ic), iron, cobalt, nickel and others. The preferred range of catalyst as above defined is from about 0.01 to about 3 parts by weight per one-hundred parts by weight of monomer.

While polymerization may be carried out in the presence of air, the rate of reaction is ordinarily faster in the absence of oxygen and hence polymerization in an evacuated vessel, at reflux, or under an inert atmosphere such as nitrogen is preferred. The temperature at which the polymerization is carried out is not critical, it may be varied widely from −30° C. to 100° C. or higher, though best results are generally obtained at a temperature of from about 0° C. to about 90° C. While the pH of the polymerization system is not critical, it is preferred that a pH of 7 or below be employed during the polymerization reaction. The polymer latex may subsequently be adjusted to any desired pH.

Other polymerization techniques and practices employed in the preparation of acrylic polymers may also be used in polymerizing the monomer mixture herein described. For example, the use of mercaptan modifiers in the reaction mixture is sometimes desirable and results generally in lower raw polymer viscosity and other allied plastic properties. Modifiers such as the primary, secondary and tertiary aliphatic mercaptans containing from 4 to 16 carbon atoms are particularly useful in this invention. Still other substances which desirably may be incorporated into the reaction medium include buffers, electrolyte salts (see "Synthetic Rubber," G. S. Whitby, John Wiley & Sons, Inc., New York, 1954, pages 226 and 227, and Industrial and Engineering Chemistry, 42, 2164 (1950)), carbon black, silica and others in a manner well understood in the art. Moreover, the polymerization may be terminated, as by addition of a polymerization inhibitor such as hydroquinone or phenyl beta-naphthylamine, before conversion of the monomers to polymer is complete. Polymers employed in the latex form for dipping, coating and impregnating leather, paper and textile fabrics can be carried from 90–100% conversion in the polymerization reaction and high Mooney viscosities are particularly desirable.

The interpolymers of this invention are useful in the latex form or in the coagulated, rubber or plastic form depending upon the particular end use. The polymers of this invention may be isolated from the latex by coagulation with the conventional alcohol or salt-acid coagulants or they may be isolated by freeze agglomeration. In general, the latex form of the polymer is most useful for coating, impregnating and dipping operations. The latex may be used, per se, it may be diluted to lower solids content or it may be blended with other dispersions or latices of other rubbery or plastic materials. It is often desirable to blend thickeners and bodying agents with the latex for improvement of flow properties in subsequent coating and dipping operations. Well known thickening agents and stabilizers such as casein, gelatin, carboxymethyl cellulose, methyl cellulose, ethyl cellulose, polyacrylic acid and polyvinyl alcohol may be used as well as other similar materials for the foregoing purpose.

The latices of this invention are useful in leather finishing, the binding of non-woven fabrics, the impregnation and coating of textile fabrics composed of synthetic and natural fibers as well as natural-synthetic fiber blends, the impregnation and coating of paper, the coating and preservation of leather, in adhesive compositions, in printing pastes for textile and paper printing and the like. The latices of this invention are particularly useful for providing improved wet strength and internal bond strength to paper and for better wet soiling and solvent resistance in non-woven fabrics. The latices embodied herein when used alone or with pigments and coloring agents are useful as indoor and outdoor paints. The rubbery and plastic polymers embodied herein are useful, per se, in the preparation of gloves, gaskets, foams, footwear, flooring and the like.

In the following illustrative examples the quantities of ingredients used are expressed in parts by weight unless otherwise indicated.

EXAMPLE I

An interpolymer (A) of ethyl acrylate, acrylonitrile, acrylic acid and N-methylol acrylamide was prepared from the following ingredients:

|  | A |
|---|---|
| Water | 98 |
| Sodium lauryl sulfate | 2.0 |
| Trisodium phosphate (electrolyte) | 0.4 |
| Ammonium persulfate | 0.2 |
| Ethyl acrylate | 94 |
| Acrylonitrile | 3 |
| Acrylic acid | 1.2 |
| N-methylol acrylamide | 1.8 |

The polymerization reactor is charged with about 63 parts of water containing the dissolved electrolyte. A separate mixture of 32 parts of water, emulsifier and monomers is stirred rapidly until emulsified. The contents of the reactor are then brought to a temperature of from 60–70° C., about 5–15% of the monomer emulsion is then added to the reactor and the catalyst dissolved in 3 parts of water is added all at once to the reactor and stirring is commenced. The remainder of the monomer emulsion is proportioned into the reactor and the polymerization is carried out at about 80° C. with continuous stirring. The addition is completed in from 1 to 4 hours. The polymerization is carried to more than 90% conversion and preferably to complete conversion of monomers to polymer. The dried polymers prepared in this manner generally are of high Mooney. In the foregoing manner other polymers having the compositions designated B–I in Table 1 were also prepared. Polymers H and I of Table 1 are control compositions which are outside the scope of the present invention.

Table 1

|  | A | B | C | D | E | F | G | H | I |
|---|---|---|---|---|---|---|---|---|---|
| Ethyl acrylate | 94 | 97 | 92 | 96 | 96.5 | 95 | 95 | 94.5 | 94 |
| Acrylonitrile | 3 |  | 5 |  |  |  |  |  | 3 |
| Acrylic acid | 1.2 | 1.2 | 1.2 | 1.5 | 1.5 |  |  | 3 | 3 |
| Methacrylic acid |  |  |  |  |  | 4 | 3 |  |  |
| N-methylol acrylamide | 1.8 | 1.8 | 1.8 | 2.5 | 2.0 | 1.0 | 2 |  |  |
| Methacrylamide |  |  |  |  |  |  |  | 2.5 |  |

EXAMPLE II

Latices of representative polymers described in Example I were first reduced to about 20% total solids by dilution with water. Each latex was then padded on a non-woven fleece web composed of 50% nylon and 50% of a cotton-rayon mixture. The treated webs were then dried on a photoprint drier followed by a 3 minute cure at 300° F. in a circulating air oven. The bound webs were then tested for percent polymer pickup, tensile, elongation, solvent resistance, soil resistance and wrinkle recovery. The tensile and elongation, which are expressed in pounds per square inch, were determined both in the machine direction and cross-machine direction. The solvent resistance is expressed as the tensile strength in pounds per square inch after the bound web has been soaked in perchloroethylene for 20 minutes. The soiling is expressed as the photovolt reflectance after the bound web has been immersed in a standard soiling solution for 20 minutes at 140° F. followed by 10 minutes of rinsing in clear water at 140° F. The light aging is expressed as the photovolt reflectance of the bound web after it has been aged for 20 hours in the fadeometer. Excellent bound non-woven fabrics can be prepared in this manner when from 50 to 100% by weight of the polymer based on the weight of the fleece is picked up on the fleece. The wrinkle recovery is expressed in degrees with a maximum of 180° possible for a sample which recovers fully. The results of these tests are given in Table 2.

Table 2

|  | A | B | C | D | E | F | G | H |
|---|---|---|---|---|---|---|---|---|
| Dry tensile: |  |  |  |  |  |  |  |  |
| Machine direction | 6.0 | 5.9 | 5.7 | 6.8 | 5.9 | 5.4 | 7.0 | 5.2 |
| Cross-machine direction | 14.4 | 16.6 | 17.0 | 17.2 | 14.7 | 16.7 | 16.7 | 17.1 |
| Percent elongation: |  |  |  |  |  |  |  |  |
| Machine direction | 51 | 47 | 47 | 46 | 36 | 52 | 46 | 45 |
| Cross-machine direction | 30 | 32 | 33 | 30 | 29 | 30 | 29 | 31 |
| Wet tensile: Cross-machine direction | 10.8 | 9.6 | 9.3 | 11.1 | 12.9 | 10.6 | 10 | 6.4 |
| Solvent resistance: Cross-machine direction | 5.8 | 5.4 | 8.6 | 10.0 | 6.2 | 5.3 | 7.4 | 3.7 |
| Wrinkle recovery: Machine direction | 164 | 161 | 166 | 164 | 159 | 154 | 160 | 155 |
| Wet soiling | 72 | 70 | 72 | 73 | 72 | 43 | 52 | 15 |

Percent pickup—varied from about 80–85%.

EXAMPLE III

Latices of polymers A and I of Table 1 were reduced to about 20% total solids by dilution with water. Each latex was then padded on a non-woven fleece composed of 60% nylon and 40% acetate fibers. The procedure and tests described in Example II were repeated with the following results.

|  | A | I |
|---|---|---|
| Dry tensile: |  |  |
| Machine direction | 20.1 | 18 |
| Cross-machine direction | 20.2 | 16 |
| Percent elongation: |  |  |
| Machine direction | 30 | 30 |
| Cross-machine direction | 31 | 50 |
| Wet tensile: Cross-machine direction | 9.8 | 7.2 |
| Solvent resistance: Cross-machine direction | 4.2 | 0.9 |
| Wrinkle recovery: |  |  |
| Machine direction | 173 | 168 |
| Cross-machine direction | 172 | 168 |
| Wet soiling | 67 | 21 |

EXAMPLE IV

The polymers used in this example are described in Example I. The latex was first diluted to 15% total solids with water. An 11 mil Munising flat paper which had previously been conditioned at 72° F. and 65% relative humidity was saturated in each case by floating the paper on top of the latex bath. The papers, after being coated on both sides in the foregoing manner, were cured at 325° F. for 3 minutes. The resulting papers were conditioned at 72° F. for 16 hours prior to testing. The results of the tests are given in Table 3.

*Table 3*

|  | A | B | C | D | E | G | I |
|---|---|---|---|---|---|---|---|
| Tensile, p.s.i.: |  |  |  |  |  |  |  |
| Dry | 48.8 | 44.4 | 41.0 | 47.2 | 47.8 | 46.8 | 43.9 |
| Wet | 27.5 | 29.9 | 27.5 | 29.4 | 28.3 | 26.9 | 12.2 |
| Percent elongation | 8.3 | 7.0 | 8.0 | 9.0 | 7.0 | 7.2 | 7.3 |
| Edge tear, p.s.i. | 25.8 | 26.5 | 20.8 | 19.5 | 25.0 | 33.2 | 34.7 |
| Internal bond, oz./in. | 24.0 | 24.0 | 22.4 | 24.0 | 24.0 | 18.4 | 9.6 |
| Percent pickup | 53.8 | 51.2 | 46.8 | 49.0 | 46.8 |  | 49.5 |

EXAMPLE V

The procedure given in Example IV was repeated using 6 mil Endura crepe paper in place of the Munising flat paper and 25% total solid latices were employed. The results of tests on the coated papers cured at 325° F. for 3 minutes are given in Table 4.

*Table 4*

|  | A | B | C | D | E | G | I |
|---|---|---|---|---|---|---|---|
| Tensile, p.s.i.: |  |  |  |  |  |  |  |
| Dry | 20 | 21.6 | 22.2 | 20.2 | 23.4 | 20.2 | 19.3 |
| Wet | 15.7 | 14.3 | 15.4 | 16.0 | 14.4 | 16.4 | 6.3 |
| Percent elongation | 18 | 18.2 | 19.0 | 16.8 | 17.6 | 16.4 | 26 |
| Edge tear, p.s.i. | 20.9 | 18.8 | 21.7 | 19.2 | 24.0 | 20.1 | 26 |
| Internal bond, oz./in. | 59.2 | 58 | 68.8 | 68.7 | 84.7 | (¹) | 52.2 |
| Percent pickup | 94 | 86 | 108 | 96 | 112 | 97 | 106 |

¹ Not measured.

What is claimed is:

1. An aqueous latex of a self-curing interpolymer of (1) from 90 to 99.8% by weight of at least one ester having the structure

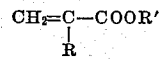

wherein R is a member of the class consisting of hydrogen, an alkyl radical having from 1 to 4 carbon atoms, a halogen and a cyano group and R' represents an alkyl radical having from 1 to 4 carbon atoms, (2) from 0 to 5% by weight of an alpha,beta-monoolefinically unsaturated nitrile, (3) from about 0.1 to 5% by weight of an alpha,beta-olefinically unsaturated monocarboxylic acid and (4) from about 0.1 to 5% by weight of an N-alkylol amide of an alpha,beta-olefinically unsaturated carboxylic acid having from 4 to 10 carbon atoms.

2. An aqueous latex of a self-curing interpolymer of (1) from 90 to 99.8% by weight of at least one ester having the structure

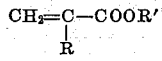

wherein R is a member selected from the group consisting of hydrogen, an alkyl radical having from 1 to 4 carbon atoms, a halogen and a cyano group and R' represents an alkyl radical having from 1 to 4 carbon atoms, (2) from 0 to 5% by weight of an alpha,beta-monoolefinically unsaturated nitrile having from 3 to 10 carbon atoms, (3) from about 0.1 to 5% by weight of an alpha,beta-monoolefinically unsaturated monocarboxylic acid having from 3 to 6 carbon atoms and (4) from about 0.1 to 5% by weight of an N-alkylol amide of an alpha,beta-olefinically unsaturated carboxylic acid having from 4 to 10 carbon atoms.

3. An aqueous latex of a self-curing interpolymer of (1) from 90 to 99.8% by weight of at least one ester having the structure

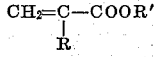

wherein R is a member selected from the group consisting of hydrogen, an alkyl radical having from 1 to 4 carbon atoms, a halogen and a cyano group and R' represents an alkyl radical having from 1 to 4 carbon atoms, (2) from 0 to 5% by weight of acrylonitrile, (3) from about 0.1 to 5% by weight of acrylic acid and (4) from about 0.1 to 5% by weight of N-methylol acrylamide.

4. An aqueous latex of a self-curing interpolymer of (1) from 90 to 99.8% by weight of ethyl acrylate, (2) from 0 to 5% by weight of acrylonitrile, (3) from about 0.1 to 5% by weight of acrylic acid and (4) from about 0.1 to 5% by weight of N-methylol acrylamide.

5. An aqueous latex of a self-curing interpolymer of (1) from 90 to 99.8% by weight of ethyl acrylate, (2) from 0 to 5% by weight of acrylonitrile, (3) from about 0.1 to 5% by weight of methacrylic acid and (4) from about 0.1 to 5% by weight of N-methylol acrylamide.

6. The process comprising polymerizing to from 90 to 100% conversion in aqueous dispersion at a temperature of from about 0° C. to about 100° C. a mixture of (1) from about 90 to 99.8% by weight of at least one lower alkyl ester of an alpha,beta-olefinically unsaturated monocarboxylic acid, in which the alkyl group contains from one to four carbon atoms, (2) from 0 to about 5% by weight of an alpha,beta-olefinically unsaturated nitrile, (3) from about 0.1 to 5% by weight of an alpha,beta-olefinically unsaturated carboxylic acid and (4) from about 0.1 to 5% by weight of an N-alkylol amide of an alpha,beta-olefinically unsaturated carboxylic acid.

7. The process comprising polymerizing to from 90 to 100% conversion in aqueous dispersion at a temperature of from about 0° C. to 90° C. in the absence of oxygen a mixture of (1) from 90 to 99.8% by weight of at least one ester having the structure

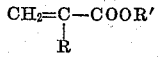

wherein R is a member selected from the group consisting of hydrogen, an alkyl radical having from 1 to 4 carbon atoms, a halogen and a cyano group and R' represents an alkyl radical having from 1 to 4 carbon atoms, (2) from 0 to 5% by weight of a member of the group consisting of acrylonitrile and methacrylonitrile, (3) from about 0.1 to 5% by weight of a member of the group consisting of acrylic acid and methacrylic acid and (4) from about 0.1 to 5% by weight of a member selected from the group consisting of N-methylol acrylamide and N-methylol methacrylamide.

8. An aqueous latex of a self-curing interpolymer of (1) from about 90 to 99.8% by weight of at least one lower alkyl ester of an alpha,beta-olefinically unsaturated monocarboxylic acid, in which the alkyl group contains from one to four carbon atoms, (2) from 0 to about 5% by weight of an alpha,beta-olefinically unsaturated nitrile, (3) from about 0.1 to 5% by weight of an alpha,beta-olefinically unsaturated carboxylic acid and (4) from about 0.1 to 5% by weight of an N-alkylol amide of an alpha,beta-olefinically unsaturated carboxylic acid.

9. An aqueous latex of a self-curing interpolymer of (1) from about 90 to 99.8% by weight of at least one ester having the structure

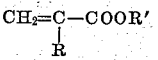

wherein R is a member selected from the group consisting of hydrogen, an alkyl radical having from 1 to 4 carbon atoms, a halogen and a cyano group and R' represents an alkyl radical having from 1 to 4 carbon atoms, (2) from 0 to 5% by weight of a member of the group consisting of acrylonitrile and methacrylonitrile, (3) from about 0.1 to 5% by weight of a member of the group consisting of acrylic acid and methacrylic acid and (4) from about 0.1 to 5% by weight of a member selected from the group consisting of N-methylol acrylamide and N-methylol methacrylamide.

10. An article comprising paper impregnated with from about 45 to 115% by weight based on the weight of said paper of an interpolymer which was contacted with the paper in aqueous latex form, said interpolymer composed of (1) from about 90 to 99.8% by weight of at least one lower alkyl ester of an alpha,beta-olefinically unsaturated monocarboxylic acid, in which the alkyl group contains from one to four carbon atoms, (2) from 0 to about 5% by weight of an alpha,beta-olefinically unsaturated nitrile, (3) from about 0.1 to 5% by weight of an alpha,beta-olefinically unsaturated carboxylic acid and (4) from about 0.1 to 5% by weight of an N-alkylol amide of an alpha,beta-olefinically unsaturated carboxylic acid.

11. An article comprising paper impregnated with from about 45 to 115% by weight based on the weight of said paper of an interpolymer which was contacted with the paper in aqueous latex form, said interpolymer composed of (1) from about 90 to 99.8% by weight of at least one ester having the structure

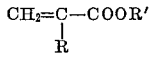

wherein R is a member selected from the group consisting of hydrogen, an alkyl radical having from 1 to 4 carbon atoms, a halogen and a cyano group and R' represents an alkyl radical having from 1 to 4 carbon atoms, (2) from 0 to 5% by weight of a member of the group consisting of acrylonitrile and methacrylonitrile, (3) from about 0.1 to 5% by weight of a member of the group consisting of acrylic acid and methacrylic acid and (4) from about 0.1 to 5% by weight of a member selected from the group consisting of N-methylol acrylamide and N-methylol methacrylamide.

12. An article comprising a non-woven fabric impregnated with an interpolymer which was contacted with the non-woven fabric in aqueous latex form, said interpolymer composed of (1) from about 90 to 99.8% by weight of at least one lower alkyl ester of an alpha,beta-olefinically unsaturated monocarboxylic acid, in which the alkyl group contains from one to four carbon atoms, (2) from 0 to about 5% by weight of an alpha,beta-olefinically unsaturated nitrile, (3) from about 0.1 to 5% by weight of an alpha,beta-olefinically unsaturated carboxylic acid and (4) from about 0.1 to 5% by weight of an N-alkylol amide of an alpha,beta-olefinically unsaturated carboxylic acid.

13. An article comprising a non-woven fleece made up of at least one type of fiber selected from the group consisting of synthetic fibers and natural fibers, said fleece being impregnated with from about 50 to 100% by weight based on the weight of fabric of an interpolymer which was contacted with the non-woven fleece in aqueous latex form, said interpolymer composed of (1) from about 90 to 99.8% by weight of at least one ester having the structure

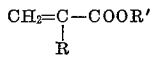

wherein R is a member selected from the group consisting of hydrogen, an alkyl radical having from 1 to 4 carbon atoms, a halogen and a cyano group and R' represents an alkyl radical having from 1 to 4 carbon atoms, (2) from 0 to 5% by weight of a member of the group consisting of acrylonitrile and methacrylonitrile, (3) from about 0.1 to 5% by weight of a member selected from the group consisting of acrylic acid and methacrylic acid and (4) from about 0.1 to 5% by weight of a member selected from the group consisting of N-methylol acrylamide and N-methylol methacrylamide.

References Cited by the Examiner

UNITED STATES PATENTS

| | | | |
|---|---|---|---|
| 2,649,438 | 8/1953 | Bruson | 260—80.5 X |
| 2,680,110 | 6/1954 | Loughran et al. | 260—80.5 X |
| 3,033,811 | 5/1962 | Brown et al. | 260—29.6 X |
| 3,037,963 | 6/1962 | Christenson et al. | 260—80.5 |
| 3,048,501 | 8/1962 | Miller et al. | 260—80.5 |
| 3,079,434 | 2/1963 | Christenson et al. | 260—80.5 X |

JOSEPH L. SCHOFER, *Primary Examiner.*

B. MANGAN, M. LIEBMAN, *Examiners.*